June 9, 1959     W. BROOKS ET AL     2,890,059
CHILD'S SEAT FOR A MOVABLE STORAGE CART
Filed Oct. 5, 1955     3 Sheets-Sheet 1
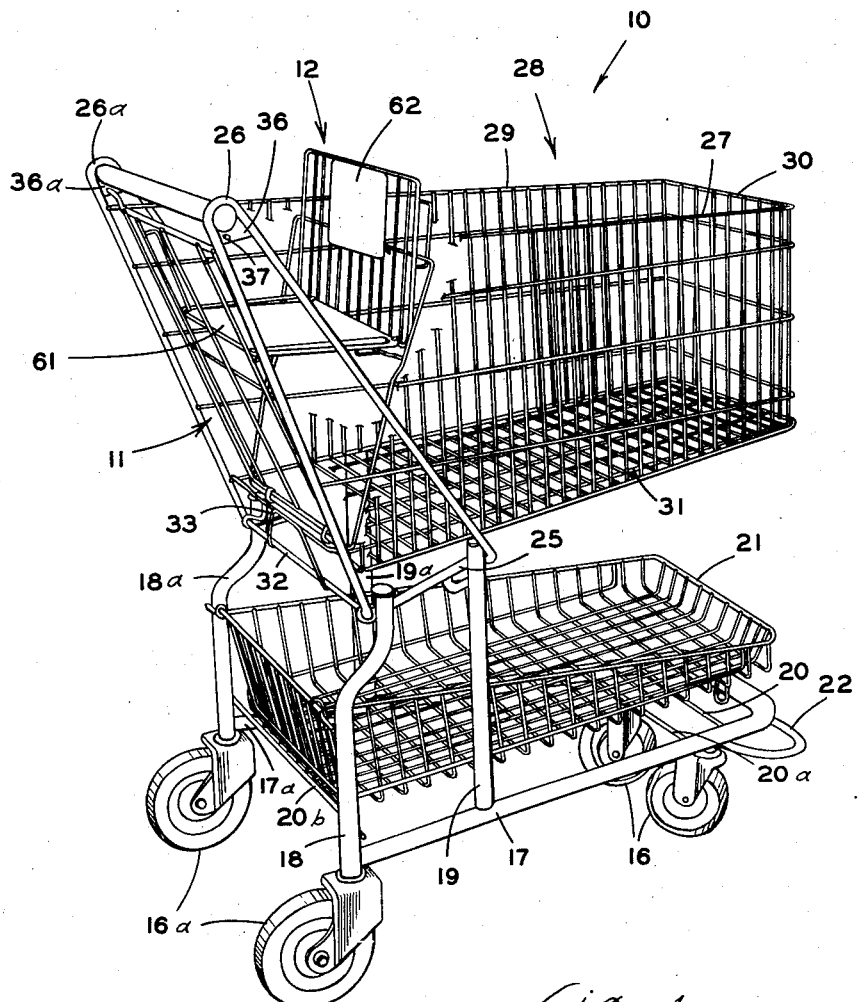
fig. 1
INVENTORS
WILLIAM BROOKS
WALTER H. SCHRAY
LYNN N. DAVIS
BY
ATTORNEY

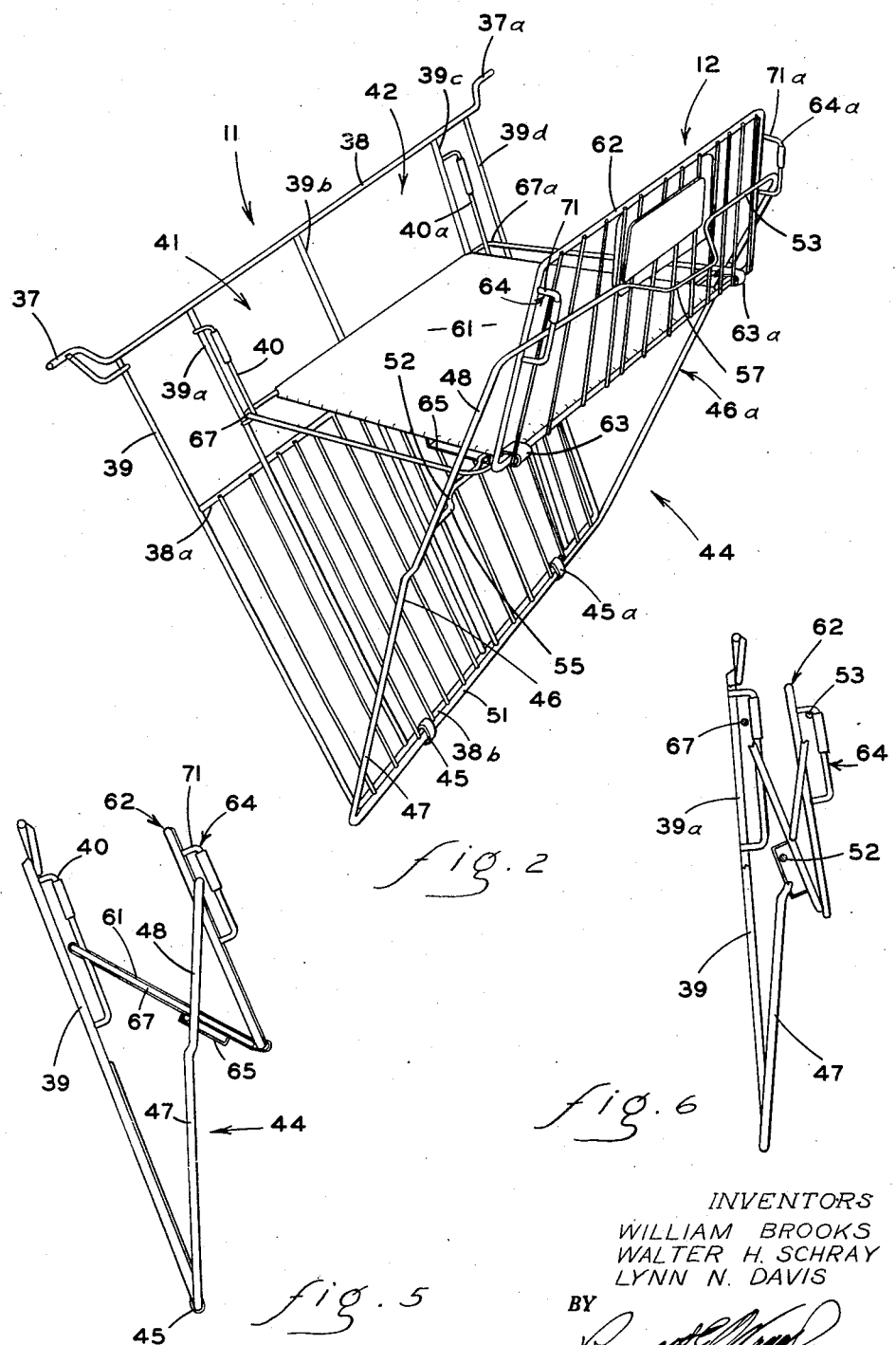

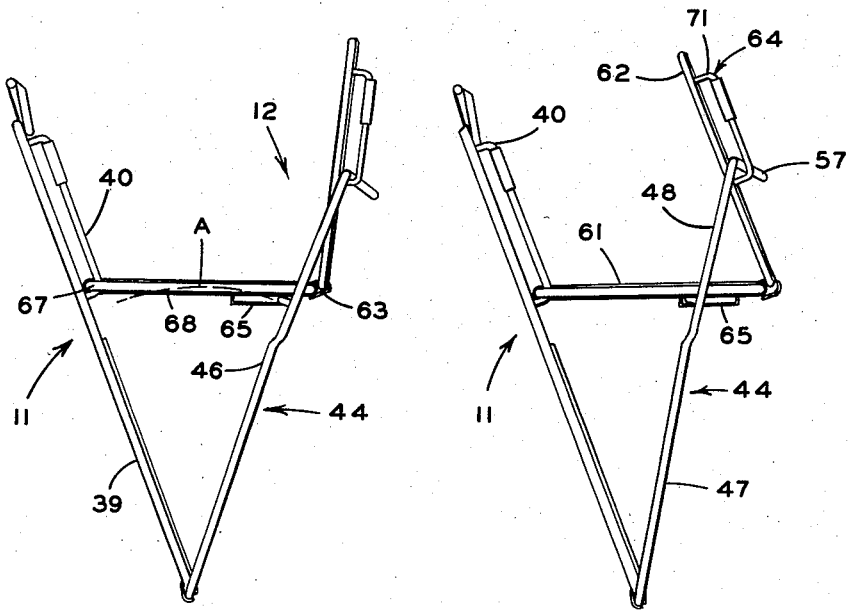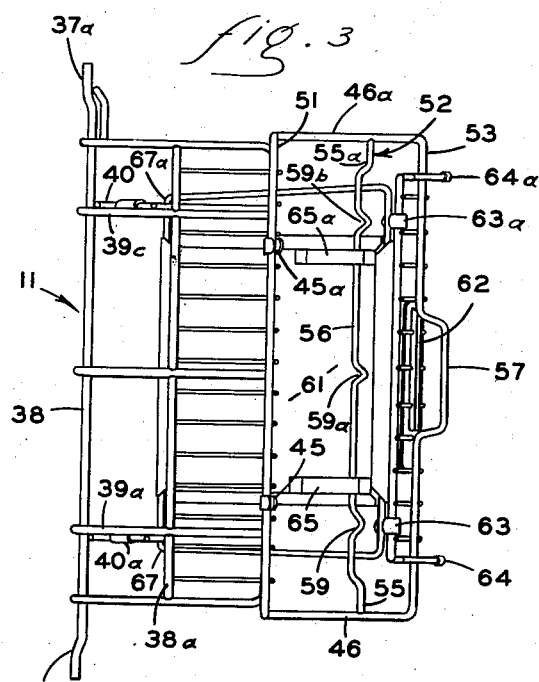

United States Patent Office 2,890,059
Patented June 9, 1959

2,890,059

CHILD'S SEAT FOR A MOVABLE STORAGE CART

William Brooks, Walter H. Schray, and Lynn N. Davis, Battle Creek, Mich., assignors to United Steel & Wire Company, Battle Creek, Mich., a corporation of Michigan Application October 5, 1955, Serial No. 538,593

12 Claims. (Cl. 280—33.99)

This invention relates to an improved structure for a movable store cart and more particularly to a nesting-type store cart provided with a child's seat which automatically collapses when another cart is nested therewithin.

For well known reasons, it is desirable to provide a child's seat on commodity-carrying carts of the type used in self serve stores and in supermarkets. Carts of this type are commonly nested, or telescoped, within each other when not in use in order to minimize the amount of space required for their storage. It is apparent that a child's seat for use on such a type of cart should also be collapsible so that it will not hinder the nesting of such carts and will occupy a minimum amount of space when the carts are nested.

Further, for reasons of economy in maintaining supplies of carts and convenience of the customer in selecting a suitable cart, it is preferable that all of them be fitted with a child's seat, and yet since in many cases the child's seat will be both unnecessary and actually in the way, it is desirable that the seat be readily collapsible by hand and when once placed in collapsed condition that it remain so without the necessity of special locking or latching devices. Accordingly, it is desirable to provide a storage cart having a child's seat which can be collapsed by hand when its use is not desired in order to make available the entire space within the upper basket of the cart for the storage of commodities, as groceries.

A further requirement of a collapsible child's seat for movable storage carts is that the parts of the seat are sufficiently solidly related to each other that, even though the seat is readily collapsible when desired, the child even when engaging in considerable activity cannot separate the parts and thereby possibly provide space between normally engaged parts into which his fingers can be inserted and injured when the parts again come together. Thus, and again without the use of special latches or other positive fastening devices, it is desirable to have the respectively movable parts of the seat held sufficiently firmly in position when the seat is in its open condition that a child cannot get its fingers in between normally contacting parts and injure them.

Accordingly, it is an object of this invention to provide a movable store cart having a collapsible child's seat thereon.

It is a further object of this invention to provide a nestable store cart having a child's seat which automatically collapses when another cart is nested therewithin.

It is a further object of this invention to provide a movable store cart which has a swingably mounted rear panel so that other carts may be nested therewithin and which has a collapsible child's seat mounted on the swingable rear panel.

It is a further object of this invention to provide a movable store cart, as aforesaid, in which the collapsing of the child's seat is caused by the swinging movement of the rear panel occurring in a nesting operation.

It is a further object of this invention to provide a movable store cart, as aforesaid, in which the mechanism causing collapsing of the child's seat is fool-proof in operation.

It is a further object of this invention to provide a collapsible seat for a nesting-type store cart including means acting positively on the seat to cause collapsing thereof when the carts are nested.

It is a further object of the invention to provide a movable storage cart, as aforesaid, and a child's seat therefor, in which the seat can be readily collapsed by hand when its use is not desired whereupon the seat will lie flat against the rear panel and take up no appreciable amount of space within the basket of the storage cart and thereby render the basket entirely available for the carrying of commodities.

A further object of the invention is to provide a collapsible child's seat, as aforesaid, which can be collapsed by hand at the will of the operator of the cart and which will then stay in collapsed condition under all normal conditions of use of the cart without the necessity of using special clips, latches or other positive means.

A further object of the invention is to provide a collapsible seat for a movable store cart whose relatively movable parts are sufficiently locked together when the seat is in its operating position that, even if the child indulges in considerable activity while using the seat, it will not be possible to get its fingers into or between the relatively movable, but normally contracting parts, of the seat and thereby injure its fingers.

Other objects and advantages of the invention will become apparent to those acquainted with this type of equipment upon reading the following description and inspecting the accompanying drawings, in which:

Figure 1 is an oblique, partially cut away, view of a store cart embodying the construction of the present invention.

Figure 2 is an oblique detail view of the swingable rear panel of the store cart and the collapsible seat.

Figure 3 is a side view of the portion of the cart illustrated in Figure 2 with the seat in its open, or use, position.

Figure 4 is a side view similar to Figure 3 but showing the seat as it starts to collapse.

Figure 5 is a side view similar to Figures 3 and 4 but showing the seat in a more collapsed position.

Figure 6 is a side view similar to Figures 3 and 4 but showing the seat in a still further collapsed position.

Figure 7 is a bottom view of the swingable rear panel and the collapsible seat.

*General construction*

In general, the invention is directed to a store cart 10 having a swingable rear panel 11. A collapsible seat 12 is mounted on the rear panel and is arranged to collapse or open in response to the movement of the rear panel. The motion of the relatively movable parts in either their collapsing or their opening movement is of such nature that it cannot take place when the seat is in use and hence it will be impossible for a a child to catch its fingers in any of the movable parts of the seat. Further, one of the supporting elements for the seat which is associated with the collapsible portion of the seat frame travels when collapsing in an arc intersecting the seat itself. Thus, during a collapsing movement the seat is urged positively from its position of use in a collapsing direction. In this way, the collapsing operation, whether occurring by reason of nesting of the carts or in response to manual actuation by the cart user, is positive and effective.

*Detailed description*

The store cart 10 includes front and rear ground contacting rollers 16 and 16a, horizontal support bars 17 and 17a, rear upright support bars 18 and 18a, forward upright support bars 19 and 19a, and lateral support bars 20, 20a and 20b which support a lower commodity carrying basket 21. A bumper 22 extends forwardly of the front rollers for the usual purpose.

The upright support bars 18 and 19 mount a horizontal rod 25. The extremities of a reversely bent support rod 26 are secured to either end of rod 25. The horizontal wire rod members defining the side wall 27 of the upper basket 28 are secured to the support rod 26 to provide a rigid assembly of the side wall. Support bars 18a and 19a mount a similar support structure including support rod 26a for the other side wall 29 and accordingly this structure will not be described in detail herein. The upper basket also includes a front panel 30 and a lower panel 31 as is conventional. A laterally extending support rod 32 extends between bars 18 and 18a and is provided with an upwardly extending stop 33 for the swingable rear panel 11.

The side walls 27 and 29 converge forwardly and the lower panel 31 is inclined upwardly with respect to the horizontal to provide a somewhat tapered assembly which can nest within a similarly constructed cart and, in turn, receive therewithin a similar cart.

It will be understood that the various rods and support members are secured to each other in any convenient, conventional manner such as by welding. Likewise, it will also be understood by those with knowledge of equipment of this type that the basket 28 and the tray 21 are commonly constructed of criss-crossing rods but could be constructed in a different manner, such as by using flat panels suitably attached together.

The structure thus far described is that of one well known type of a store cart. The invention is not concerned with these details of construction and it is apparent that the invention about to be described can be employed on cart constructions which differ in many details from that described above. Therefore, it is to be understood that the description given thus far is for illustrative purposes only and the invention is not to be limited to use on this one particular type of cart.

Plates 36 and 36a are secured between the legs of support rods 26 and 26a, respectively. The rear panel 11 is provided with offset laterally extending pins 37 and 37a (Figure 2) which pass through by openings in the plates 36 and 36a and are pivotally mounted therein.

As is most clearly shown in Figure 2, the rear panel includes a plurality of laterally extending main support rods 38, 38a and 38b, and a series of substantially vertically extending support rods 39, 39a, 39b, 39c and 39d. Leg openings 41 and 42 are provided between rods 39a and 39b and rods 39b and 39c, respectively. As will be described in greater detail hereinbelow, guide tracks 40 and 40a are secured to support rods 29a and 39c and extend inwardly thereof.

A collapsible seat supporting frame 44 is secured to support rod 38b by bands 45 and 45a which encircle support rod 38b and laterally extending rod member 51 and support the frame 44 for pivotal movement with respect to the rear panel 11. The support frame 44 includes a pair of side members 46 and 46a. The side member 46 includes a lower portion 47 and an upper portion 48 which is offset from and lies at a small angle with respect to the longitudinal axis of the lower portion 47. The structure of side member 46a is identical with the structure of side member 46. The support frame 44 includes laterally extending rod members 51, 52 and 53. The support rod member 52 includes short end portions 55 and 55a which are coplanar with upper portion 48 and the upper portion of side member 46a. The rod member 52 also has a central portion 56 which is offset forwardly and inclined upwardly so that it is coplanar with lower portion 47 of side member 46 and the lower portion of side member 46a. Thus, as the frame member 44 pivots relative to the rear panel 11, the central portion 56 moves through a constant radius arcuate path A (Figure 3) about the pivot axis of the support frame 44. Indentations 59, 59a and 59b (Figure 7) are provided in the raised central portion 56 and are adapted to receive rods 39a, 39b and 39c when the frame 44 is adjacent the rear panel. The rod member 53 extends between the side members 46 and 46a and is provided with a raised handle portion 57.

The collapsible seat 12 includes a seat portion 61 and a back rest 62. Hook member 63 and 63a are fixed to the rear edge of seat portion 61 and encircle the lower edge of back rest 62 to support the back rest 62 for pivotal movement with respect to the seat portion. The back rest 62 has guides 64 and 64a fixed on and spaced from the back side thereof defining retaining loops extending from the back rest. The rod member 53 fits between the back rest 62 and rods 64 and 64a and slides therealong when the rear panel 11 is moved to cause the back rest to pivot relative to the seat portion.

The seat portion 61 has a pair of mounting brackets 65 and 65a (Figure 7) secured to the lower surface thereof within which is received the raised central portion 56 of the rod 52. The mounting brackets 65 and 65a guide and limit the movement of the central portion 56 relative to the seat portion 61. The brackets 65 and 65a in effect provide a lost motion connection between the support frame 44 and the seat portion 61.

As is apparent from Figure 3, the lower edge 68 of the seat portion 61 forms a chord of the arcuate path A traced by the raised central position 56 for reasons which will become apparent as this specification proceeds.

The leftward and rightward corners 67 and 67a, respectively, of the seat portion 61 are received within the track members 40 and 40a and are guided for movement from a position where the seat portion 61 is nearly transverse to the plane of the rear panel (Figure 3) to a position where the seat is approximately parallel with rear panel 11.

The relative spacing and lengths of the frame 44, the seat 61 and the back rest 62 are such that as the parts move in a collapsing direction, the upper rod 53 of the frame 44 will engage the upper portions 71 and 71a (Figures 2 and 5) of the guide loops 64 and 64a and support the entire weight of the back rest and seat assembly. This will lift said back rest and seat assembly off from the rod 52 (Figure 6) which had previously been supporting said assembly by bearing against the leftward (upward as the collapsing operation proceeds) end of the mounting brackets 65 and 65a.

*Operation*

In considering the operation of the seat of the invention, it should be borne in mind that the operation is exactly the same whether the seat swings into collapsed condition in response to upward movement of the panel 11 in a nesting operation between two carts or whether the seat is collapsed manually. In the case of a nesting operation, the position of the seat and rear panel assembly is changed so that the force of gravity urges the frame 44 toward the rear panel 11. In the case of manual closing, the hand of the operator, usually grasping the handle 57, urges the frame 44 toward the rear panel 11. Thus, the closing operation is the same in either case and the only difference lies in the source of the force urging said frame 44 toward the rear panel 11.

In the following description, it will be assumed that the closing is being done manually since this is carried out with the rear panel 11 continuously in the same position. Thus, by maintaining the rear panel 11 in the same position throughout all of the figures of the drawings illustrating the closing operation, the relative arrangement of the parts is more easily compared and the operation thereby disclosed more clearly.

Assuming that the cart is in use and the seat assembly 12 is unfolded as appearing in Figure 3, the central portion 56 (Figure 7) of rod member 52 is at the rightward end of mounting brackets 65 and 65a (Figure 3) and the seat portion 61 is supported by the lower ends of guide tracks 40 and 40a. As the seat assembly moves to its Figure 4 position, the support frame 44 will pivot around its lower end toward the rear panel 11 and the rod 52 will move from the rightward to the leftward end of brackets 65 and 65a. There will be little, if any, movement of the seat portion 61 during this time because of the lost motion connection provided by brackets 65 and 65a and the relatively small arc of movement of the central portion 56. However, the back rest 62 will be swung toward the seat portion 61 by rod member 53 (Figure 2) as shown in Figure 4. Further movement of the frame 44 toward the rear panel 11 (Figure 5) causes the rod 52 to trace the arcuate path A (Figure 3) while contacting the leftward end of brackets 65 and 65a. In so doing it will exert an upward force on the bottom of the seat portion 61 because of the position of the seat portion 61 as a chord across the arcuate path A. This upward force positively raises the seat portion and causes the initial upward movement of its leftward end along guide tracks 40 and 40a.

Simultaneously, the back rest 62 will start to move downwardly with respect to the frame assembly 44, this movement being permitted by the lost motion connection provided by the rear guide tracks 64 and 64a. This permits continued rotative movements of the parts and their further collapsing. It will be observed throughout all of these movements that at every point the several parts are firmly fixed together, that their several movements are mechanically controlled within narrow limits but that there is no looseness or sloppiness between the parts. The several tracks of movement of the respective parts lie in clearly defined and exactly controlled paths and there is no chance for any of such parts to escape from their proper operating positions. It will be further observed that gravity is not relied upon for effecting any movement at all other than the imposing of a force urging the frame 44 toward the rear panel 11 and that once this is accomplished, the rest of the movements follow from mechanical necessity. From the time the leftward and upward movement of the rod 52 lifts the leftward end of the seat up from its support on the lower ends of the guides 40 and 40a, it will be recognized that said rod 52 constitutes the sole support for the seat and back rest assembly.

As the collapsing movement progresses to the position shown in Figure 6, the upper rod 53 engages the upper ends 71 and 71a of the rear guide tracks 64 and 64a, lifts the seat and back rest assembly from its former support on the rod 52 engaging the leftward ends of the mounting brackets 65 and 65a and thereafter provides the sole support for said seat and back rest. In this manner, the weight of the seat and back rest assembly is supported at its extreme upper end onto the extreme upper end of the frame 44. By thus locating a downwardly acting weight on the extreme upper end, and by the same token the extreme leftward portion, of the frame 44, a maximum moment arm is obtained for urging said frame 44 in a counterclockwise direction, and hence exerting the maximum tendency for holding same closed. Simultaneously, by supporting the seat and back rest assembly by its extreme upper, and also leftward, point, the maximum moment arm is applied for urging this assembly in a clockwise direction, which also is a closing direction. Thus, by the time that closing is completed, the weight distribution on all of the movable parts is such that such weight is utilized to its maximum extent for holding the parts in collapsed condition against the rear panel 11. Thus, when the seat is closed manually for making the upper basket fully available for the carrying of groceries, or other commodities, it will hold itself closed in all ordinary conditions of use of the cart and no special catches, snaps or other holding devices are required. By this, whether the closing is by the raising of the back panel incident to a nesting operation, or manually to make available the entire space of the upper basket, the parts will stay in collapsed condition without further attention.

The opening of the seat is a reverse operation from the collapsing operation above described. It is effected by applying a force to the frame 44 moving it away from the panel 11 and this will normally be done by the hand of the operator engaging the handle 57. The movement is guided with equal precision to that described above in connection with the collapsing movement and when the seat is in open position it will by its own weight remain firmly in open position for seating a child. The child will, of course, be seated in the usual manner of such seats on such storage carts, namely, with his back against the back rest 62 and with his legs extending out of the leg openings 41 and 42.

Although particular, preferred embodiments of this invention have been disclosed herein for illustrative purposes, it will be understood that modifications and variations thereof within the scope of such disclosure are fully contemplated unless specifically stated to the contrary in the appended claims.

We claim:

1. In a movable store cart, the combination comprising: a cart frame; a rear panel swingably mounted on said cart frame; a seat; a guide track on said rear panel, track following means on said seat contacting and guided by said guide track, said guide track including means at its lower end to support said seat; said seat being mounted for swinging movement with respect to said track and said rear panel; a support frame connected to the lower edge of said rear panel and mounted for pivotal movement with respect thereto, said support frame contacting the lower surface of said seat intermediate the front and rear edges thereof and supporting said seat and means on said support frame and movable toward said rear panel with respect to said seat for exerting an upwardly directed force on said seat when said support frame is pivotally moved with respect to said rear panel.

2. In a movable store cart, the combination comprising: a cart frame; a rear panel swingably mounted adjacent its upper edge on said cart frame; a seat, a guide track on said rear panel, track following means on said seat contacting and guided by said guide track, said seat being mounted for swinging movement with respect to said track and said rear panel; a support frame connected to the lower portion of said rear panel and mounted for pivotal movement with respect thereto, lost motion means joining said support frame to said seat for supporting said seat and permitting a limited amount of movement of said support frame with respect to said seat, said lost motion means including seat support means on said support frame, said seat in one position thereof defining a chord of the arc through which said seat support means moves when said seat support means is pivotally moved with respect to said rear panel.

3. In a movable store cart having a collapsible seat assembly, the combination comprising: a cart frame; a rear panel swingably mounted adjacent its upper edge on said cart frame; a seat portion, a guide track on said rear panel, track following means on said seat portion contacting and guided by said guide track, said seat portion being mounted for swinging movement with respect to said track and said rear panel; a back rest hingedly secured to said seat portion; a support frame connected to the lower edge of said rear panel and mounted for pivotal movement with respect thereto, said support frame including a back rest supporting means and a seat support means; said back rest supporting means and said seat support means contacting and being mounted for relative movement with respect to said back rest and said seat portion respectively, said guide track including means to support said seat portion in a position where said seat portion lies generally transverse to the plane of the rear panel, said seat portion in said position defining a chord of the arc through which said seat support means moves when said support frame is pivotally moved with respect to said rear panel.

4. The device defined in claim 3 wherein said back rest has a lost motion connection with said back rest supporting means at a point above the connection of said seat support means to said seat portion; said support frame reaching the upper limit of its movement with respect to said back rest prior to the complete collapsing of said assembly and thereby supporting, when in the collapsed condition, the entire weight of the seat and back rest from a point near the upper end of said back rest and near the upper end of said supporting frame.

5. In a movable store cart, the combination comprising: a cart frame; said cart frame including a rear panel swingably mounted adjacent its upper edge; a seat portion; means on said frame for supporting said seat portion in a first position where said seat portion lies generally transverse to the plane of the rear panel, said seat portion being movable to a second position wherein said seat portion lies at a lesser angle with respect to said rear panel; a back rest hingedly secured to said seat portion; a support frame mounted on said cart frame for pivotal movement toward and away from said rear panel, said support frame including back rest support means and seat support means, said seat support means being mounted for support of and movement relative to said seat portion, said seat portion in said first position defining a chord of the arc through which said seat support means moves when said support member is pivotally moved with respect to said rear panel.

6. In a collapsible seat for a storage cart, the combination comprising: a panel comprising a wall of said cart and normally positioned in an inwardly and downwardly sloping position; a supporting frame hinged at its lower end to a lower portion of said panel; said frame having first and second cross bars parallel with the axis of said hinging, said second cross bar being placed intermediate the ends of said frame and said first cross bar being placed near the upper end of said frame; a seat portion extending from said panel across said second cross bar with a first end thereof adjacent said panel and being supported in part by said second cross bar; means holding said first end of said seat portion against downward movement beyond a predetermined point; a back rest hinged to the other end of said seat portion and extending upwardly past said first cross bar, first holding means holding said first cross bar substantially against the back of said back rest but permitting said back rest to move downwardly with respect to said first cross bar, and means limiting downward movement of said back rest with respect to said first cross bar; second holding means limiting movement of said second cross bar along the bottom of said seat portion toward said first end of said portion; said seat portion in its normal open position extending as a chord across the arc described by said second cross bar as it moves from open position of said assembly toward collapsed condition thereof.

7. The device defined in claim 6 wherein the parts are so proportioned that as they are moving in a collapsing direction said second cross bar strikes said second holding means before said first cross bar strikes said first holding means and when said first cross bar strikes said first holding means the further closing movement will lift said second holding means off from said second cross bar.

8. In a movable store cart having a cart frame including a rear panel swingably mounted at its upper end, a collapsible seat assembly having a seat and means for supporting said seat in a first position where said seat lies generally transverse to the plane of the rear panel, said seat being movable to a second position wherein said seat lies approximately parallel to the plane of said rear panel, said means comprising: a seat support frame pivotally connected at its lower end to said rear panel so that the upper ends of said panel and said seat support frame may be placed in adjacent relationship with respect to each other wherein said seat is in said second position or in spaced apart relationship wherein said seat is in said first position; first means connecting one edge of said seat to said rear panel; second means connecting the opposite edge of said seat to the said seat support frame, said second connecting means including a horizontally extending rod mounted on said seat support frame and secured against transverse movement with respect thereto, said horizontally extending rod positioned adjacent said seat and being movable in substantially a horizontal direction with respect thereto toward said panel when said seat frame is pivoted toward said panel; and guide means secured to said seat and having vertical end portions which are spaced apart a distance substantially greater than the width of said horizontally extending rod, said horizontally extending rod being received between said end portions for free horizontal sliding movement therebetween, said guide means thereby guiding and limiting horizontal movement of said horizontally extending rod with respect to said seat so that movement of said seat support frame, from a spaced apart relationship with respect to said rear panel into its adjacent position will move said seat from its first to its second position.

9. A movable store cart according to claim 8 wherein said horizontally extending rod is fixed to the seat support frame and located below said seat and said guide means includes means depending from the lower surface of said seat defining a closed loop through which said rod extends, said loop extending toward said rear panel and the lengthwise extent of said loop being substantially greater than the width of said rod whereby said rod is freely slidable horizontally with respect to said seat within said loop.

10. In a movable store cart having a collapsible seat assembly, the combination comprising: a cart frame; a container mounted on said frame, said container having a rear panel pivotally connected at its upper end to said cart; a seat support frame pivotally connected at its lower end to the lower end of said rear panel so that the upper ends of said panel and said seat support frame may be placed adjacent each other or in spaced apart relationship, said seat support frame including substantially horizontal seat support means intermediate the upper and lower ends thereof, said seat support frame having an opening therethrough above said seat support means; a seat disposed between said panel and said seat support frame means connecting said seat to said rear panel and said support frame so that said seat may be pivoted about one edge thereof and the opposite edge may move substantially vertically, said seat being located above and closely adjacent said seat support means and being supported thereby in a substantially horizontal position when said rear panel and said seat support frame are in said spaced apart relationship, said seat being at least in part slidably movable through said opening; lost motion means adjacent one edge of said seat and associated with said seat support means for moving said seat through said opening and pivoting said seat about said one edge and moving said opposite edge vertically upon movement of said seat support frame toward said rear panel; means on said rear panel for engaging the opposite edge of said seat when said rear panel and said seat support frame are in spaced apart relationship so that said seat support means and said last-named means support said seat in a substantially horizontal position, said seat being movable into a position of parallelism with said rear panel and said seat support frame when same are positioned adjacent each other.

11. In a movable store cart having a collapsible seat assembly, the combination comprising: a cart frame; a container mounted on said frame, said container having a rear panel pivotally connected at its upper end to said cart; a seat support frame pivotally connected at its lower end to the lower end of said rear panel so that the upper ends of said panel and said seat support frame may be placed adjacent each other or in spaced apart relationship, said seat support frame including substantially horizontal seat support means located between the upper and lower ends thereof; a seat disposed between said panel and said seat support frame and located above and closely adjacent said seat support means for being supported thereby in a substantially horizontal position when said rear panel and said seat support frame are in spaced apart relationship; lost motion means adjacent one edge of said seat and associated with said seat support means and connecting said seat to said seat support frame for pivotal movement with respect to said seat support means; means connecting the opposite edge of said seat to said rear panel for vertical sliding movement with respect thereto, said last-named means including stop means on said rear panel for engaging the opposite edge of said seat when said panel and said seat support frame are in spaced apart relationship so that said seat will be supported in a substantially horizontal position by said stop means and said seat support means, the opposite edge of said seat being free to slide upwardly from said stop means along said rear panel, said seat when in said horizontal position defining a chord of the arc through which said seat support means moves when said seat support frame moves pivotally toward said rear panel whereby said seat support means will engage the lower surface of said seat and will cause pivotal movement of said seat about said one edge of said seat and will move said opposite edge of said seat upwardly along said rear panel to effect a collapsing thereof.

12. In a movable store cart having a collapsible seat assembly, the combination comprising: a cart frame; a container mounted on said frame, said container having a rear panel pivotally connected at its upper end to said cart; a seat support frame pivotally connected at its lower end to the lower end of said rear panel so that the upper ends of said panel and said seat support frame may be placed adjacent each other or in spaced apart relationship, said seat support frame including substantially horizontal seat support means located between the upper and lower ends thereof, said seat support frame having an opening therethrough above said horizontal seat support means; a seat disposed between said panel and said seat support frame and located above and closely adjacent said seat support means for being supported thereby in a substantially horizontal position when said rear panel and said seat support frame are in spaced apart relationship; said seat, at least in part, being slidably movable through said opening; lost motion means adjacent one edge of said seat and associated with said seat support means and connecting said seat to said seat support frame for pivotal movement with respect to said seat support means; means connecting the opposite edge of said seat to said rear panel for vertical sliding movement with respect thereto, said last-named means including stop means on said rear panel for engaging the opposite edge of said seat when said panel and said seat support frame are in spaced apart relationship so that said seat will be supported in a substantially horizontal position by said stop means and said seat support means, the opposite edge of said seat being free to slide upwardly from said stop means along said rear panel, said seat when in said position defining a chord of the arc through which said seat support means moves when said seat support frame moves pivotally toward said rear panel whereby said seat support means will engage the lower surface of said seat and will cause pivotal movement of said seat about said one edge of said seat and will move said opposite edge of said seat upwardly along said rear panel to effect a collapsing thereof, said seat moving through said opening during movement of said seat support means to the extent permitted by said lost motion means.

References Cited in the file of this patent

UNITED STATES PATENTS

| | | |
|---|---|---|
| 1,355,005 | Schechter | Oct. 5, 1920 |
| 1,784,390 | Rice | Dec. 9, 1930 |
| 2,662,775 | Goldman | Dec. 15, 1953 |
| 2,769,645 | Young | Nov. 6, 1956 |
| 2,813,725 | Hoedinghaus et al. | Nov. 19, 1957 |
| 2,860,885 | Schweitzer | Nov. 18, 1958 |

FOREIGN PATENTS

| | | |
|---|---|---|
| 1,027,679 | France | Feb. 18, 1953 |